US012812340B2

(12) United States Patent
Tran et al.

(10) Patent No.: US 12,812,340 B2
(45) Date of Patent: Nov. 24, 2026

(54) INCIDENT MANAGEMENT IN A TELECOMMUNICATIONS NETWORK

(71) Applicant: T-Mobile USA, Inc., Bellevue, WA (US)

(72) Inventors: Antoine T. Tran, Bellevue, WA (US); Ming Shan Kwok, Seattle, WA (US); Emile Minh Tran, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 479 days.

(21) Appl. No.: 18/126,685

(22) Filed: Mar. 27, 2023

(65) Prior Publication Data

US 2024/0334162 A1 Oct. 3, 2024

(51) Int. Cl.

| | |
|---|---|
| ***H04W 4/12*** | (2009.01) |
| ***H04W 4/02*** | (2018.01) |
| ***H04W 4/38*** | (2018.01) |
| ***H04W 4/40*** | (2018.01) |

(52) U.S. Cl.

CPC ............ *H04W 4/12* (2013.01); *H04W 4/023* (2013.01); *H04W 4/38* (2018.02); *H04W 4/40* (2018.02)

(58) Field of Classification Search

CPC .......... H04W 4/12; H04W 4/38; H04W 4/023

See application file for complete search history.

(56) References Cited

U.S. PATENT DOCUMENTS

| | | | | |
|---|---|---|---|---|
| 10,157,422 | B2 * | 12/2018 | Jordan Peters | G06Q 30/0207 |
| 11,312,392 | B2 * | 4/2022 | Katardjiev | B60W 10/20 |
| 2005/0060069 | A1 * | 3/2005 | Breed | B60W 40/06 701/408 |
| 2018/0211546 | A1 * | 7/2018 | Smartt | H04W 4/023 |
| 2019/0025819 | A1 * | 1/2019 | Ferguson | G05D 1/0088 |
| 2021/0110713 | A1 * | 4/2021 | Silva | H04W 4/44 |
| 2021/0368308 | A1 * | 11/2021 | Katardjiev | H04L 67/131 |
| 2022/0172625 | A1 * | 6/2022 | Chou | G08G 1/164 |
| 2024/0102817 | A1 * | 3/2024 | Bales | G01C 21/3691 |
| 2025/0329252 | A1 * | 10/2025 | Golestani | G08G 1/0116 |

* cited by examiner

*Primary Examiner* — Erika A Washington

(74) *Attorney, Agent, or Firm* — Lee & Haves. P.C.

(57) ABSTRACT

Techniques for detecting incidents in an environment and configuring messages for sending to devices in the environment are described herein. A telecommunications network can implement a computing device to receive sensor data from one or more sensors and/or vehicle data from one or more vehicles for identifying an occurrence of an incident in the environment. The computing device can generate unique messages for sending to various devices and/or vehicles in the environment to mitigate an impact of the incident. The computing device can configure messages based on a distance of the device or the vehicle from the incident. The messages can include a suggested action for a user of a device and/or the vehicle to use to avoid or reduce the impact of the incident.

20 Claims, 6 Drawing Sheets

INCIDENT MANAGEMENT IN A TELECOMMUNICATIONS NETWORK

BACKGROUND

Modern terrestrial telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies: Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Telecommunications systems may include fifth generation (5G) cellular-wireless access technologies to provide improved bandwidth and decreased response times to a multitude of devices that may be connected to a network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
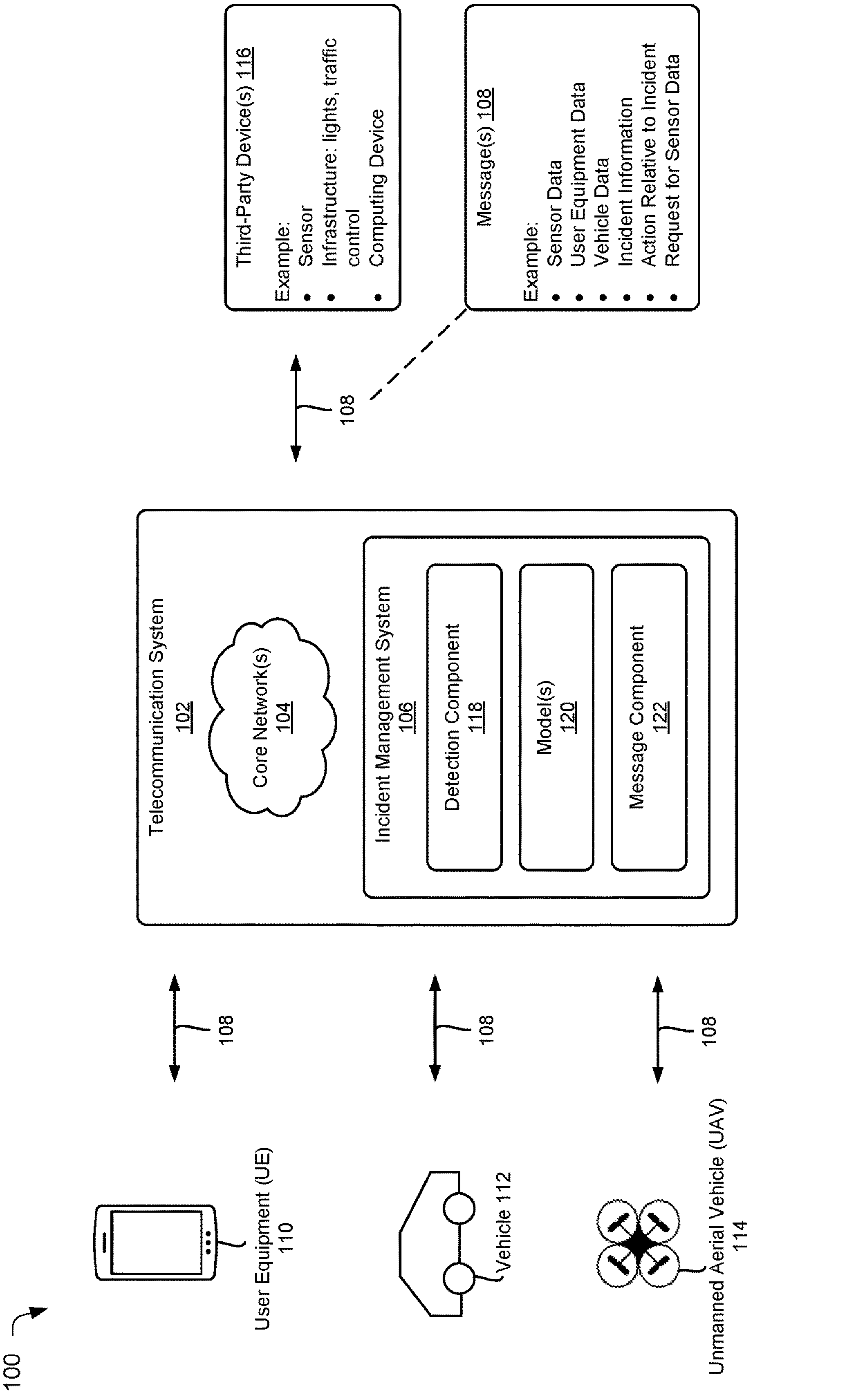
FIG. 1 depicts an example network environment in which an example telecommunication system implements an example incident management system to exchange one or more messages with example devices.

This application relates to techniques for detecting incidents in an environment and configuring messages for sending to devices in the environment. For example, a telecommunications network can include network elements in the environment to receive sensor data from one or more sensors and/or vehicle data from one or more vehicles. The telecommunications network can implement a computing device to identify an occurrence of an event based on the sensor data and/or the vehicle data. The computing device can configure unique messages for sending to various devices and/or vehicles in the environment to mitigate an impact of the incident. The computing device can, for instance, configure messages for a device or vehicle based on a distance of the device or the vehicle from the incident. In some examples, the messages can include a suggested action for a user of a device and/or the vehicle to use to avoid or reduce the impact of the incident.

By way of example and not limitation, the techniques can be used to detect incidents affecting traffic, public safety, weather, or other incident impacting vehicles and pedestrians in a geographic area managed by a municipality having sensors in the geographic area (e.g., a smart city). To receive sensor data from the sensors, a telecommunications network can include various network elements (e.g., a base station, an antennae, a transceiver, a serving node, a computing device, etc.) in various locations throughout the geographic area. Each network element can be thought of as a "local" node or device for processing sensor data from a sensor(s) within a threshold distance of a respective network element. A telecommunication provider can employ different numbers of network elements in the geographic area to process sensor data associated with the municipality. This enables for efficient use of available computational resources (e.g., processor(s), memor(ies), etc.) to generate messages for sending over the telecommunications network to the vehicles, user equipment associated with pedestrians, and/or a device associated with the municipality. In addition, deploying the network elements to control different regions enables for transmitting the messages over the telecommunications network in less time while using fewer processing resources to generate the messages.

Network elements of the telecommunications network can also or instead receive data from the vehicles and/or the user equipment for processing to configure a message. For instance, a network element, a computing device, or other entity of a telecommunication provider can receive vehicle data from a vehicle computing device associated with a vehicle. The vehicle data can include on-board unit (OBU) data describing a location, a velocity, acceleration, braking, a path, airbag deployment, etc. of the vehicle at a previous time. Data associated with the user equipment can identify a location of a user, a destination of the user, user preferences, etc. The vehicle data and/or the user equipment data can be used, in various examples, to configure a message for each vehicle, user equipment, etc. in an environment.

The network element can represent a computing device configured to determine an action to mitigate the incident for including in a message to a device (e.g., a vehicle, user equipment, infrastructure associated with the municipality such as a traffic light, a traffic control light, a street light, a lane indicator, and the like). In various examples, the action can vary depending upon a type of incident occurring as well as a location of each device from the incident, as discussed herein. For example, the computing device can configure messages differently for a tornado, a vehicle accident, or an incident requiring emergency services. Further, the messages can be based on a distance from the incident and therefore may be unique to direct people or vehicles to alternate safe locations. As a non-limiting example, a message can be transmitted to cause light indicators to open a lane for an emergency vehicle to access a congested area. In this example, vehicles and/or user equipment can also receive unique messages to enable the emergency vehicle to enter and exit an area requiring service.

In some examples, a computing device associated with the telecommunication provider can implement a model to receive input data (e.g., sensor data, vehicle data, user equipment data, etc.) and verify presence of an incident based on the input data. The computing device can also determine supplemental data describing the incident for including in a message. The supplemental data can represent further detail about the incident, a path around the incident, just to name a few. For example, the model can receive image data, audio data, etc. from one or more sensors, and verify a public safety incident at a location within a boundary of the municipality. Supplemental data for each vehicle or device can differ based on a location of the respective device (e.g., directions to safety can include distance information, etc.).

The techniques described herein can improve operation of the telecommunications network by reducing an amount of time to configure data and transmit data. For instance, the physical and logical topology of the telecommunication network can help reduce the amount of data to be transmitted for providing notification of an incident. Information associated with the incident can be transmitted in a relatively small part of the telecommunication network (e.g., a cell tower, a county, a zip code, or other area) thereby targeting user equipment and/or vehicles impacted (or potentially impacted) by the incident. Incidents can be verified in less time by having network elements deployed in an environment within threshold distances of fixed sensors (e.g., managed by a municipality, a vehicle, etc.). The telecommunication network can generate and transmit message data usable to improve safety during potentially dangerous events.

The techniques described herein can improve a telecommunications network by detecting incidents that can affect operation of network elements due to an incident. The techniques can include altering settings of network elements as needed prior to and during the incident to provide communication channels to a greatest number of UEs, vehicles, etc.

As described herein, models may be representative of machine learned models, non-machine learning models, or a combination thereof. That is, a model may refer to a machine learning model that learns from a training data set to improve accuracy of an output (e.g., a prediction). Additionally or alternatively, a model may represent logic and/or mathematical functions that generate approximations which are usable to make predictions.

FIG. 1 depicts an example network environment 100 in which an example telecommunication system implements an example incident management system to exchange one or more messages with example devices. For example, a telecommunication system 102 can include one or more core network(s) 104 for an incident management system 106 to exchange one or more messages 108 with a user equipment (UE) 110, a vehicle 112, an unmanned aerial vehicle (UAV) 114 and/or third-party device(s) 116, just to name a few. Using the techniques described herein, the incident management system 106 can exchange the message(s) 108 to detect, verify, resolve, or otherwise manage incidents occurring in the environment 100. For example, the techniques can be used to detect impacts to human safety and/or traffic flow and communicate actions to resolve the impacts to improve pedestrian traffic, vehicle traffic, network capacity of the telecommunications network, etc.

In various examples, the telecommunication system 102 can represent functionality to provide a communication session (e.g., an exchange of data) between various devices, and can include one or more radio access networks (RANs), as well as one or more core networks linked to the RANs. For instance, the devices (e.g., the UE 110, the vehicle 112, the UAV 114, the third-party device(s) 116, among others) can wirelessly connect to a base station or other access point of a RAN, and in turn be connected to the core network(s) 104. The RANs and/or the core network(s) 104 can be compatible with one or more radio access technologies, wireless access technologies, protocols, and/or standards. For example, wireless and radio access technologies can include fifth generation (5G) technology, Long Term Evolution (LTE)/LTE Advanced technology, other fourth generation (4G) technology, High-Speed Data Packet Access (HSDPA)/Evolved High-Speed Packet Access (HSPA+) technology, Universal Mobile Telecommunications System (UMTS) technology, Global System for Mobile Communications (GSM) technology, WiFi® technology, and/or any other previous or future generation of radio access technology. In this way, the telecommunication system 102 is compatible to operate with other radio technologies including those of other service providers. Accordingly, a message from the device(s) may be processed by telecommunication system 102 independent of the technology used by a respective device.

In some examples, the core network(s) 104 can represent a service-based architecture that includes multiple types of network functions that process control plane data and/or user plane data to implement services for various devices. In some examples, the services comprise the messages 108 which may include a text, a data file transfer, an image, a video, a combination thereof, and so on. The network functions of the core network(s) 104 can include an Access and Mobility Management Function (AMF), a Session Management Function (SMF), a User Plane Function (UPF), a Policy Control Function (PCF), and/or other network functions implemented in software and/or hardware, just to name a few. Examples of network functions are also discussed in relation to FIG. 3, and elsewhere.

In some examples, the incident management system 106 can provide functionality to generate and/or facilitate the exchange of the message(s) 108 which can include one or more of: sensor data from a sensor in the environment 100, UE data associated with the UE 110, vehicle data associated with the vehicle 112, third-party data associated with the third-party device(s) 116, data associated with another device type, and the like. The message(s) 108 can also or instead represent information about an incident in the environment 100 determined by another component or model of the incident management system 106. In some examples, the message 108 can indicate an action (e.g., a step for resolving the incident) for sending to a particular device to alleviate or reduce an impact of the incident on the device. Other examples of the message(s) 108 can be found throughout this disclosure.

In some examples, functionality associated with the incident management system 106 can be included in a computing device associated with a telecommunications provider (e.g., a Mobile Network Operator (MNO)).

The UE 110 can represent any device that can wirelessly connect to the telecommunication network, and in some examples may include a mobile phone such as a smart phone or other cellular phone, a personal digital assistant (PDA), a personal computer (PC) such as a laptop, desktop, or workstation, a media player, a tablet, a gaming device, a smart watch, a hotspot, a Machine to Machine device (M2M), an Internet of Things (IoT) device, or any other type of computing or communication device. An example architecture for the UE 110 is illustrated in greater detail in FIG. 5.

The vehicle 112 can represent an autonomous vehicle in a fleet of vehicles or a semi-autonomous vehicle, for example. The vehicle 112 can include a vehicle computing device such as on-board unit (OBU), or other device, for storing previous vehicle information (e.g., travel information, route information, position data, acceleration data, velocity data, etc.). In various examples, vehicle data associated with the vehicle 112 (and other vehicles in the environment 100) can include OBU information for use as input data to the incident management system 106.

The UAV 114 can include one or more sensors and a computing device to exchange data with the incident management system 106 via the core network(s) 104. In some examples, the UAV 114 can send sensor data to the detection component 118 for use in various determinations such as identifying an action for various devices (or users). The message 108 can represent a request from the incident management system 106 to the UAV 114 for additional or supplemental information describing the incident. For instance, a camera, microphone, or other sensor of the UAV 114 can capture a characteristic of the incident for describing as part of one or more of the messages 108.

The third-party device(s) 116 can represent one or more of: a fixed sensor (e.g., a roadside unit (RSU)), a moveable sensor, a street light, a lane light, a sign, a traffic light, a speed limit, a movable barrier, or other structure controlled by a third-party, such as a municipality. For example, the third-party device(s) 116 can vary by city given that different cities can have different infrastructure (e.g., roads, bridges, highways, sidewalks, bike lanes, movable barriers, etc.) which can be controlled using the third-party device(s) 116.

As depicted in FIG. 1, the incident management system 106 comprises a detection component 118, one or more models 120, and a message component 122 to implement the techniques described herein. For example, the detection component 118 can receive data from a variety of sources (e.g., a sensor in the environment 100 operated by a municipality such as a city, a sensor of the vehicle 112, a sensor of the UE 110, a sensor of the UAV 114, and so on) and detect presence of an accident, a weather event, a crowd control event, or other event impeding a capability for a user of the UE 110 and/or the vehicle 112 to navigate in the environment 100 and/or communicate using the core network(s) 104. For instance, the detection component 118 can receive data from the UE 110, the vehicle 112, a sensor, or other devices to identify an occurrence of an incident.

The models(s) 120 may be representative of machine learned models, non-machine learning models, or a combination thereof implemented by the incident management system 106 (or a component thereof). That is, the model(s) 120 may refer to a machine learning model that learns from a training data set to improve accuracy of an output (e.g., a prediction). Additionally or alternatively, a model may represent logic and/or mathematical functions that generate approximations which are usable to make predictions. The model 120 can, in various examples, represent a machine learned model, a heuristic model, a statistical model, or a combination thereof.

Training data may include a wide variety of data, such as image data, video data, audio data, other sensor data, etc., that is associated with a value (e.g., a desired classification, inference, prediction, etc.). Such values may generally be referred to as a "ground truth." To illustrate, the training data may be used for image classification and, as such, may include an image of an environment that is captured by a sensor and that is associated with one or more classifications (e.g., is an incident present, yes or no). In some examples, such a classification may be based on user input (e.g., user input indicating that the image depicts a specific type of incident) and/or may be based on the output of another machine learned model. In some examples, such labeled classifications (or more generally, the labeled output associated with training data) may be referred to as ground truth.

The message component 122 can represent functionality to generate and/or exchange the message(s) 108 over the core network(s) 104. In some examples, the message component 122 can generate a message for sending to a device prior to, during, and/or after detection of the incident. For example, the incident management system 106 can request data (e.g., image data, audio data, position data, or other sensor data, etc.) from a sensor in the environment 100 (e.g., affixed sensor, a sensor coupled to the vehicle 112, etc.) for use in determining whether the incident exists and/or for detecting changes in severity of the incident over time. Data from various devices may also or instead be received after the incident to assess accuracy of an action implemented by the devices (compared to a suggested action provided by the message component 122, for instance). Further detail of the incident management system 106 and the components thereof can be found throughout this disclosure, including in the discussion of FIG. 2.

In some examples, the incident can be associated with human safety and the techniques can include preventing and/or resolving potential harm to a group of people. For instance, the core network(s) 104 can be used to exchange notifications related to a human crush to notify different UEs of the occurrence of the human crush. The notifications can include an action to remedy the incident (if occurred) including sending the messages 108 with different instructions (e.g., a suggest action to perform such as a direction of travel to reduce the crowd density) to UEs, etc.

In various examples, the message component 122 can generate information specific for a device based on the location of the device relative to a location of the incident. Continuing with the example above, the message component 122 can configure messages based on a location of each device (or user thereof) relative to the human crush to direct users in various positions within the incident In one specific non-limiting example, an audio message can be automatically sent to the devices for output to notify the users of the risk associated with the incident, and a way to alleviate such risk. Additionally, or alternatively, the message component 122 can configure a message for sending to the third-party device including controlling infrastructure in the environment 100 (e.g., a street light, a lane light, a sign, a traffic light, a speed limit, etc.). In this way, incidents related to crowd density (or other impacts to human safety) can be managed to improve safety of users in the environment 100.

In some examples, the incident management system 106 can generate messages for responding to a crowd control event such as a sporting event, concert, or other gathering of people in a public location, etc. Whether a parade, a protest, a celebration, or other type of gathering, the techniques can be used to communicate to a group of users by exchanging data related to the crowd control event with a respective device or vehicle associated with each user.

By gathering data from various sources, the telecommunication system 102 can leverage data from different devices having different point of view of the incident using sensors of each device. In various examples, actions to remedy the incident can be determined for each of the different devices based on the severity of the incident (e.g., an impact area) and/or a device type (e.g., a vehicle can travel at a higher velocity than a pedestrian, which can be considered when determining an action). An emergency responder can, for instance, access an incident more quickly by the incident management system 106 configuring the messages 108 to cause a lane to open, control traffic lights, a movable barrier, and so on.

While shown separately in FIG. 1, the detection component 118, the model(s) 120, and the message component 122

(and the functionality thereof) can be including in a single component of a computing device.

Figure 2:
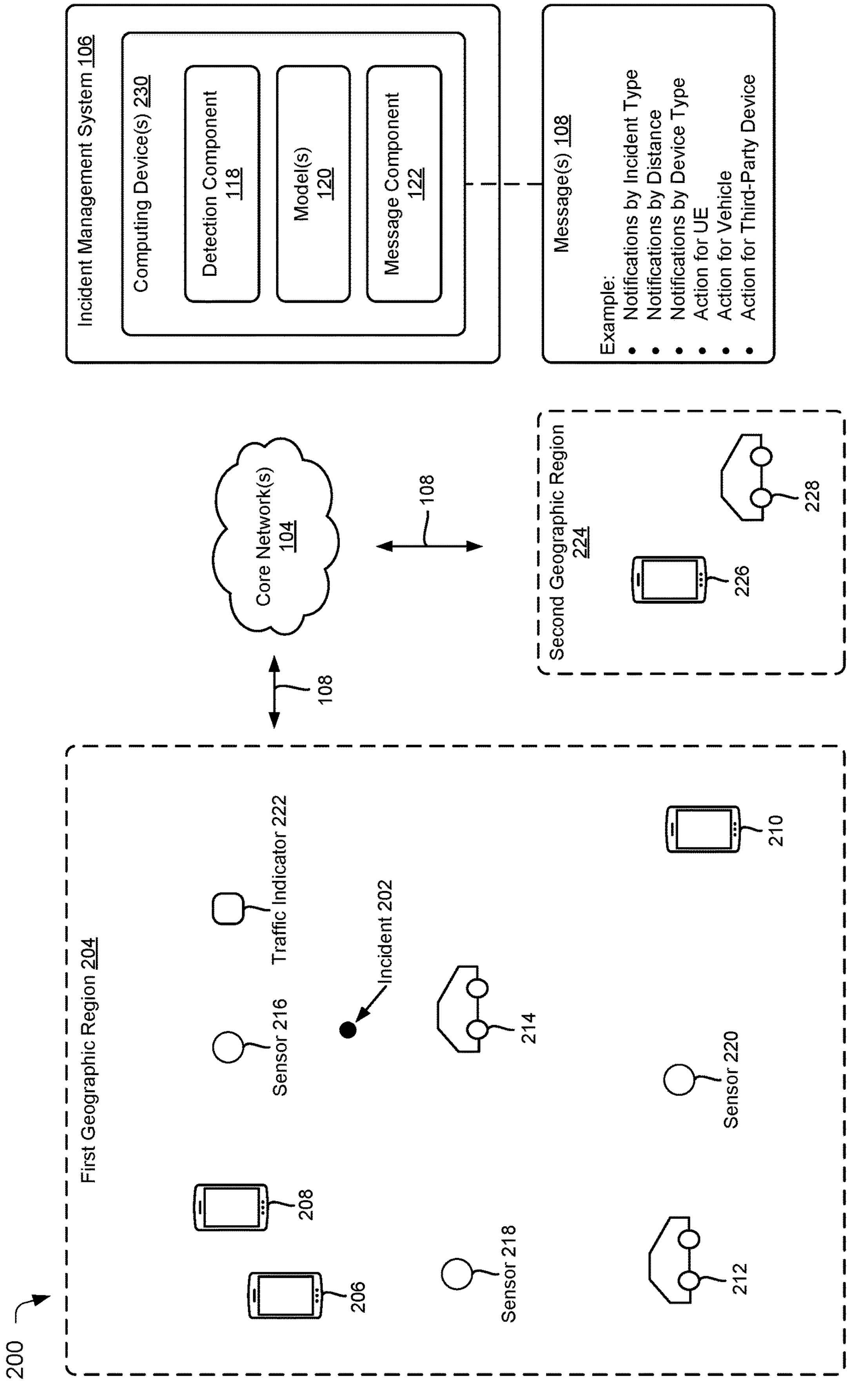
FIG. 2 depicts another example network environment in which an example incident management system exchanges one or more messages with example devices impacted by an incident in a geographic region.

FIG. 2 depicts another example network environment 200 in which an example incident management system (e.g., the incident management system 106) exchanges one or more messages with example devices impacted by an incident in a geographic region. For example, an incident 202 can occur in a first geographic region 204 that includes multiple UEs such as a UE 206, a UE 208, and a UE 210 as well as multiple vehicles such as a vehicle 212 and a vehicle 214. Of course, in other examples a different number of devices and/or device types can be included in the environment 200. As depicted in FIG. 2, the first geographic region 204 further includes multiple devices associated with a third-party such as a sensor 216, a sensor 218, a sensor 220, and a traffic indicator 222. As shown, the environment 200 includes a second geographic region 224 adjacent the first geographic region 204, though any number of geographic regions may be included. The second geographic region 224 includes a UE 226 and a vehicle 228 for illustrative purposes though in other examples any number of devices or device types can be included (e.g., sensors, street lights, traffic lights, additional UEs, additional vehicles, etc.).

The incident management system 106 in shown in FIG. 2 having one or more computing device(s) 230 comprising the detection component 118, the model(s) 120, and the message component 122 of FIG. 1. The computing device(s) 230 can be located in various positions in the first geographic region 204 and/or the second geographic region 224. For example, the telecommunication system 102 can deploy a computing device at a location proximate a threshold number of sensors. By deploying computing devices at various locations, computational requirements for identifying and mitigating an incident by the telecommunication system can be reduced (e.g., versus using fewer devices in a region). Further, processing time and/or transmission time for generating and/or transmitting the messages 108 can be improved by deploying the computing device(s) 230 in the environment 200. In some examples, the computing device(s) 230 can represent a network element such as a base station, a transceiver, an antennae, a receiver, or other electronic device.

Generally, the environment 200 can represent a portion of a city (e.g., a smart city) comprising the first geographic region 204 and the second geographic region 224. While not shown, the first geographic region 204 and the second geographic region 224 can include a road or intersection of roadways, a crosswalk, a building, or other static or dynamic objects in a real-world environment. In some examples, the first geographic region 204 and the second geographic region 224 can include a variety of hardware, devices, sensors, and the like associated with the third-party (e.g., a controllable traffic light or sign, an electronic lane indicator, a sidewalk indicator, a movable barrier (e.g., a barrier that changes state between above ground and below ground to control egress), among others). The first geographic region 204 and/or the second geographic area 224 can vary in size or shape and can include a variety of sensors, traffic lights, electronic signs, and so on. In some examples, a model 120 can determining a number of regions, a size of a region, and/or a shape of a region to divide areas of the city such that the resultant regions enable the computing device(s) 230 to manage incidents "locally" while also sending messages to nearby regions also affected by the incident as needed. In such examples, a nearby region (e.g., the second geographic region 224) can independently process input data from sensors or devices within a boundary of the region while also serving as relay point for exchanging messages to further UEs, vehicles, etc. received from the first geographic region 204.

The incident 202 can comprise various types including but not limited to: an accident, natural disaster, weather (e.g., tornado, snow storm, etc.), health event, public safety event, traffic event, a crowd control event, or other event impacting a UE, a vehicle, and/or a user (e.g., impacting navigation or safety of the vehicle or a user of the UE). The impact on the UE, the vehicle, and/or the users can vary based on a type of incident that occurs. Accordingly, the message component 122 can configure a unique message based on a device type such that a UE, a vehicle, etc. receive messages that include an action that is determined based on a capability of the respective device. For example, a vehicle can be directed away from the incident 202 using a roadway having a speed limit that is higher than a pedestrian also wanting to avoid the area. In this example, the pedestrian can receive a message different from the message configured for the vehicle to improve safety and/or flow of traffic away from the incident 202.

In some examples, an additional incident can occur during the incident 202, and the computing device(s) 230 can identify actions for including in messages that mitigate both incidents collectively. By leveraging available sensor data, device data, vehicle data, etc., actions can be determined in less time and with more accuracy to prevent or reduce impacts of the incident 202 and additional incidents (if occurring).

In various examples, the detection component 118 can determine a position of each of the UEs, vehicle, sensors, etc. in the first geographic region 204 and/or in the second geographic region 224, as well as a position of the incident 202. For instance, previous data exchanges with the core network(s) 104 can indicate a current position of a device relative to a coordinate system, such as data associated with a Global Positioning System, or other location service. The detection component 118 can determine the position of the incident 202 based at least in part on sensor data, device data, and/or vehicle data, just to name a few. Sensor positions can be determined by the detection component 118 (e.g., based on a fixed position, information provided by a third-party, etc.) and used by the model 120 to determine the position of the incident 202. A distance between the respective positions of the UEs, vehicles, etc. and the incident 202 can be considered by the message component 122 during generation of a message, as described herein.

In FIG. 2, the vehicle 214 is closer to the incident 202 than the vehicle 212 and the vehicle 228, and the sensor 216 is closer to the incident 202 than the sensor 218 and the sensor 220. In various examples, the message component 122 can configure a different message for the vehicle 214 than messages for the other vehicles further away which may have more options for avoiding the incident 202 (e.g., different routes that are uncongested). In some examples, the UE 206 and the UE 208 may receive a message having an action to avoid the incident 202 that is different from the message sent to the UE 210, which is further from the incident 202 (e.g., a different speed, route, etc.).

The computing device(s) 230 can receive sensor data from the sensor 216, the sensor 218, the sensor 220, a sensor of the vehicle, a sensor in another geographical area, a sensor of a UE, and so on at various times. Sensor data from different times can be used to assess a change in severity of the incident 202 (e.g., is the impact improving or worsening). The message component 122 can continue to configure the messages 108 over time to provide useful actions for current conditions that change as the severity changes over time.

In some examples, the message component 122 can generate message data (e.g., a notification, image data, video data, audio data, etc.) for including in the messages 108. The message data can represent a notification that the message component 122 generates based on an incident type, a device type receiving the notification, and/or a distance of the device from the incident, among others. For example, a first message can be generated for the vehicle 214 based on vehicle data received from the vehicle 214 at a previous time, and a second message can be generated for the UE 208 based on data received from the UE 208 at a previous time. The first message can include a first action to remedy the incident 202 and the second message can include a second action to remedy the incident 202. The message component 122 can also or instead generate a message for a third-party device (e.g., the third-party device(s) 116) usable to control the device relative to the incident 202. For example, the traffic indicator 222 can change state to allow an emergency vehicle to reach the incident 202, for the vehicle 214 to leave the area, or any other reason than improves flow of traffic or safety for users associated with the incident 202. The traffic indicator 222 can represent, for example, a traffic light, a traffic sign, or any other third-party device (e.g., third-party device(s) 116).

In various examples, the message component 122 can generate a message for sending to a Public Service Answering Point (PSAP) (e.g., an emergency service center for responding to the incident). For example, the message component 122 can configure a message that includes information about the incident 202 such as image data, audio data, etc. that is gathered by the detection component 118 over time (e.g., from various sensor in the environment). In some examples, the message component 122 can send a message to the PSAP in response to detecting a number of calls to an emergency center (e.g., a number of 911 calls made by UEs, vehicles, etc.) to improve a response to the incident by emergency services. In this way, incidents affecting public safety can be addressed sooner and with more accuracy by having supplemental information from remote sensors included in the message.

In some examples, the message component 122 can generate a message for an incident related to a search for a person or vehicle in the environment 100. For example, an alert can be issued for finding a particular vehicle, and the techniques can be used to detect the vehicle in the environment. The detection component 118 can, for example, have previous permission from a vehicle or UE to access a camera or other sensor for a period of time for searching for the particular vehicle. For example, a camera of a vehicle can detect license plates of nearby vehicles, and send a notification that includes the license information in a message to the computing device(s) 230.

Figure 3:
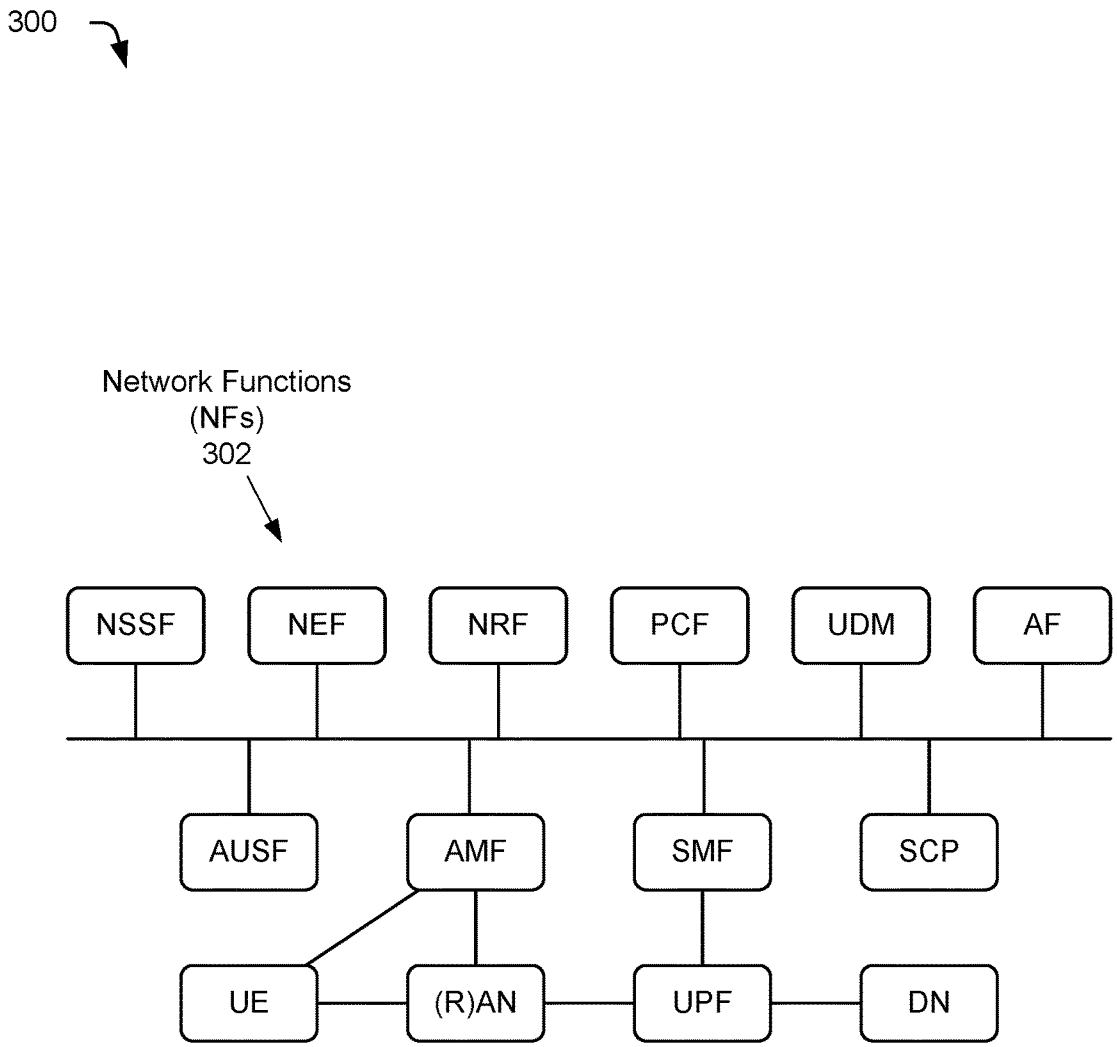
FIG. 3 depicts an example system architecture for a fifth generation (5G) telecommunication network.

FIG. 3 depicts an example system architecture for a fifth generation (5G) telecommunication network. In some examples, the telecommunication network can comprise the core network(s) 104 in FIG. 1 that includes a service-based system architecture in which different types of network functions (NFs) 302 operate alone and/or together to implement services. Standards for 5G communications define many types of NFs 302 that can be present in 5G telecommunication networks (e.g., the core network(s) 104), including but not limited to an Authentication Server Function (AUSF), Access and Mobility Management Function (AMF), Data Network (DN), Unstructured Data Storage Function (UDSF), Network Exposure Function (NEF), Network Repository Function (NRF), Network Slice Selection Function (NSSF), Policy Control Function (PCF), Session Management Function (SMF), Unified Data Management (UDM), Unified Data Repository (UDR), User Plane Function (UPF), Application Function (AF), User Equipment (UE), (Radio) Access Network ((R)AN), 5G-Equipment Identity Register (5G-EIR), Network Data Analytics Function (NWDAF), Charging Function (CHF), Service Communication Proxy (SCP), Security Edge Protection Proxy (SEPP), Non-3GPP InterWorking Function (N3IWF), Trusted Non-3GPP Gateway Function (TNGF), and Wireline Access Gateway Function (W-AGF), many of which are shown in the example system architecture of FIG. 3.

One or more of the NFs 302 of the core network(s) 104 can be implemented as network applications that execute within containers (not shown). The NFs 302 can execute as hardware elements, software elements, and/or combinations of the two within telecommunication network(s), and accordingly many types of the NFs 302 can be implemented as software and/or as virtualized functions that execute on cloud servers or other computing devices. Network applications that can execute within containers can also include any other type of network function, application, entity, module, element, or node.

Figure 4A:
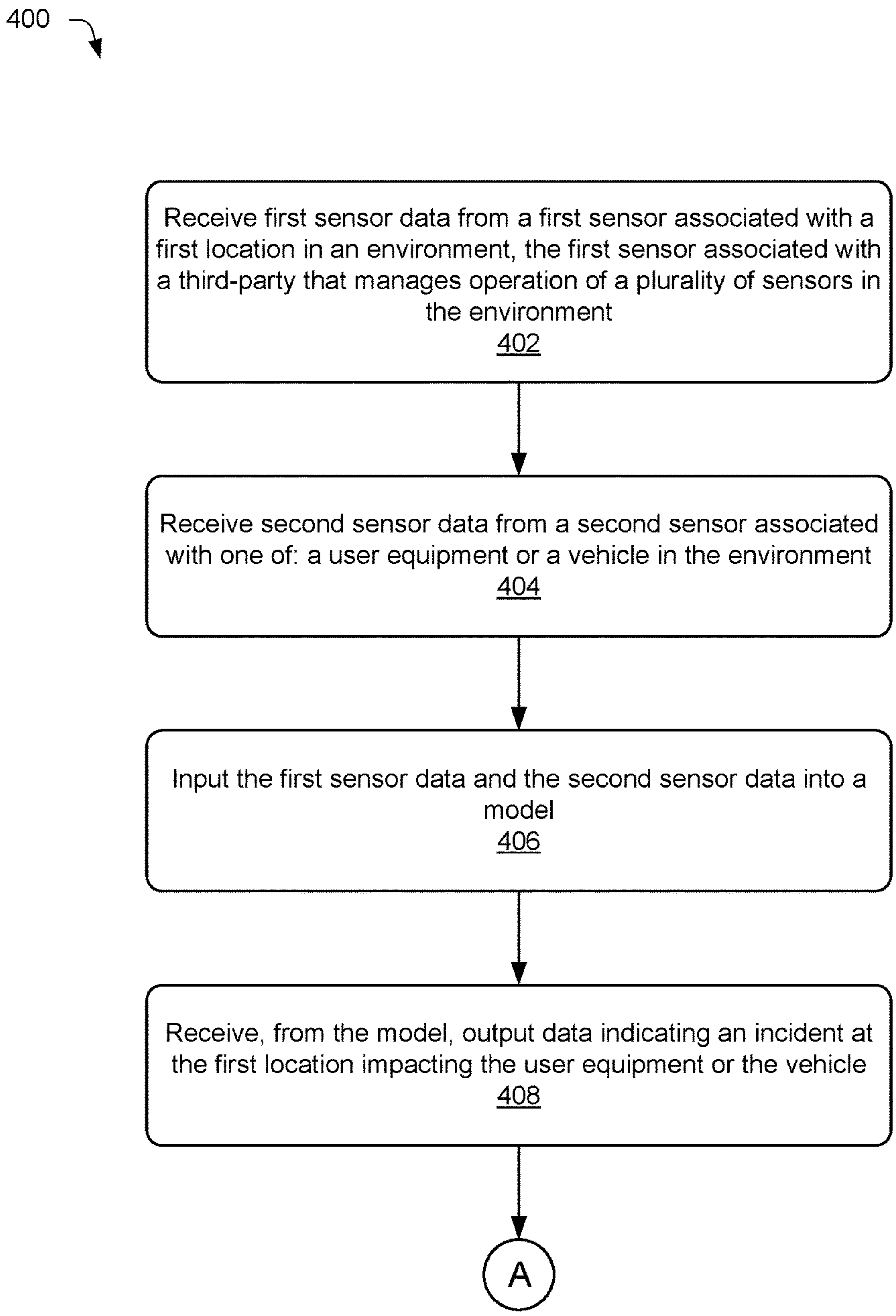
FIG. 4A is a first part of a flowchart depicting an example process for generating a notification for sending over a telecommunication network.

FIG. 4A is a first part of a flowchart depicting an example process for generating a notification for sending over a telecommunication network. Some or all of the process 400 may be performed by one or more components in FIGS. 1-3, as described herein. For example, some or all of process 400 may be performed by the incident management system 106 of FIG. 1.

At operation 402, the process may include receiving first sensor data from a first sensor associated with a first location in an environment, the first sensor associated with a third-party that manages operation of a plurality of sensors in the environment. In some examples, the operation 402 may include the computing device(s) 230 receiving sensor data from a fixed sensor and/or a movable sensor in a geographic region associated with a municipality that manages or otherwise controls infrastructure including a variety of sensor modalities. The first sensor data can, for example, represent image data or video data from a camera, audio data from a microphone, spatial information from a lidar sensor, etc. By way of example and not limitation, the first sensor data may represent information from one or more road-side units (RSU)s.

At operation 404, the process may include receiving second sensor data from a second sensor associated with one of: a user equipment or a vehicle in the environment. For instance, the operation 404 can include receiving second sensor data from a sensor coupled to the user equipment or the vehicle. By way of example and not limitation, the second sensor data may represent image data, video data, audio data, position data, or additional information about the UE or the vehicle. For example, the UE 208 can send the message 108 that includes information about the UE (e.g., route information, previous locations, etc.), information about a user of the UE (e.g., travel time, speed, etc.), data captured by a camera or other sensor of the UE, and the like.

At operation 406, the process may include inputting the first sensor data and the second sensor data into a model. In some examples, the operation 406 may include the model 120 receiving the first sensor data and the second sensor data as input. In various examples, the model 120 can receive other input data from another UE, another vehicle, another third-party device (e.g., the third-party device(s) 116). In some examples, a UAV (e.g., the UAV 114), an IoT device, a storage device comprising historical data, and the like, can send data to the model 120 for processing. In various examples, the model 120 can receive input from a user interface of a UE, a vehicle, or other device indicating whether or not an incident is present in the environment.

At operation 408, the process may include receiving, from the model, output data indicating an incident at the first location impacting the user equipment or the vehicle. For example, the model 120 determining an occurrence of an incident in the environment (e.g., a classification based on the first and second sensor data). In some examples, the model 120 can identify changes in network activity over time (e.g., an increase in network activity in the vicinity of the incident). The first sensor data and/or the second sensor data may also or instead be used to detect the incident using a previous or current image of the incident. As discussed herein, the incident can be associated with an accident, a weather event, an impact to personal safety of a user in the environment, and so on.

Figure 4B:
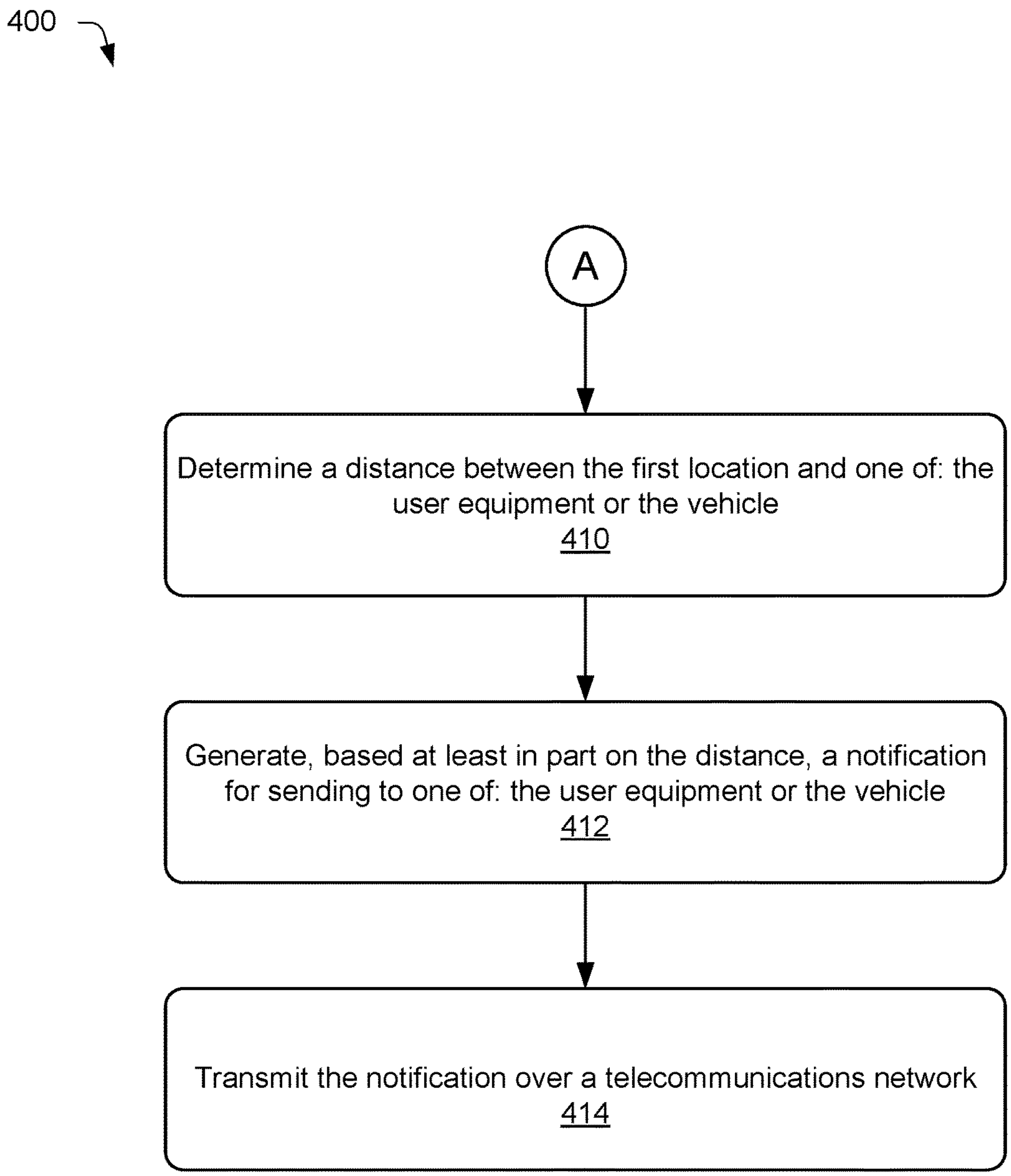
FIG. 4B is a second part of the flowchart depicting the example process for generating a notification for sending over a telecommunication network.

FIG. 4B is a second part of the flowchart depicting the example process for generating a notification for sending over a telecommunication network.

At operation 410, the process may include determining a distance between the first location and one of: the user equipment or the vehicle. In some examples, the operation 410 may include the model 120 determining a position of the user equipment or the vehicle relative to the location of the incident. For instance, the first sensor data and/or the second sensor data can indicate a location of the UE or the vehicle at a particular time. The model 120 can determine an impact area related to the incident and generate a threshold distance for sending messages to various UEs, vehicles, third-party devices, or other devices. The threshold distance for sending messages can vary based on an incident type, severity of the incident, velocity capabilities of the devices (or users thereof). In other words, the model 120 can receive data representing information about previous routes, speed, acceleration, etc. of a UE or a vehicle for consideration when outputting a determination.

At operation 412, the process may include generating, based at least in part on the distance, a notification for sending to one of: the user equipment or the vehicle. For instance, the distance of a respective device to the incident can be considered when generating a message, notification, or the like for that device. The notification can also or instead be generated to include a suggest action for the UE or the vehicle to take relative to the incident. In various examples, the suggested action can vary based on a device type (e.g., a UE has a maximum velocity, a vehicle a different maximum velocity), an incident type, and/or a distance from the incident (e.g., a location within the threshold distance of the incident).

At operation 414, the process may include transmitting the notification over a telecommunications network. In some examples, the operation 414 may include transmitting, by the computing device(s) 230, the message 108 over the core network(s) 104 of the telecommunication system 102. In various examples, the notification can cause the UE or the vehicle to reduce an impact of the incident by providing the suggested action specific for the device.

Figure 5:
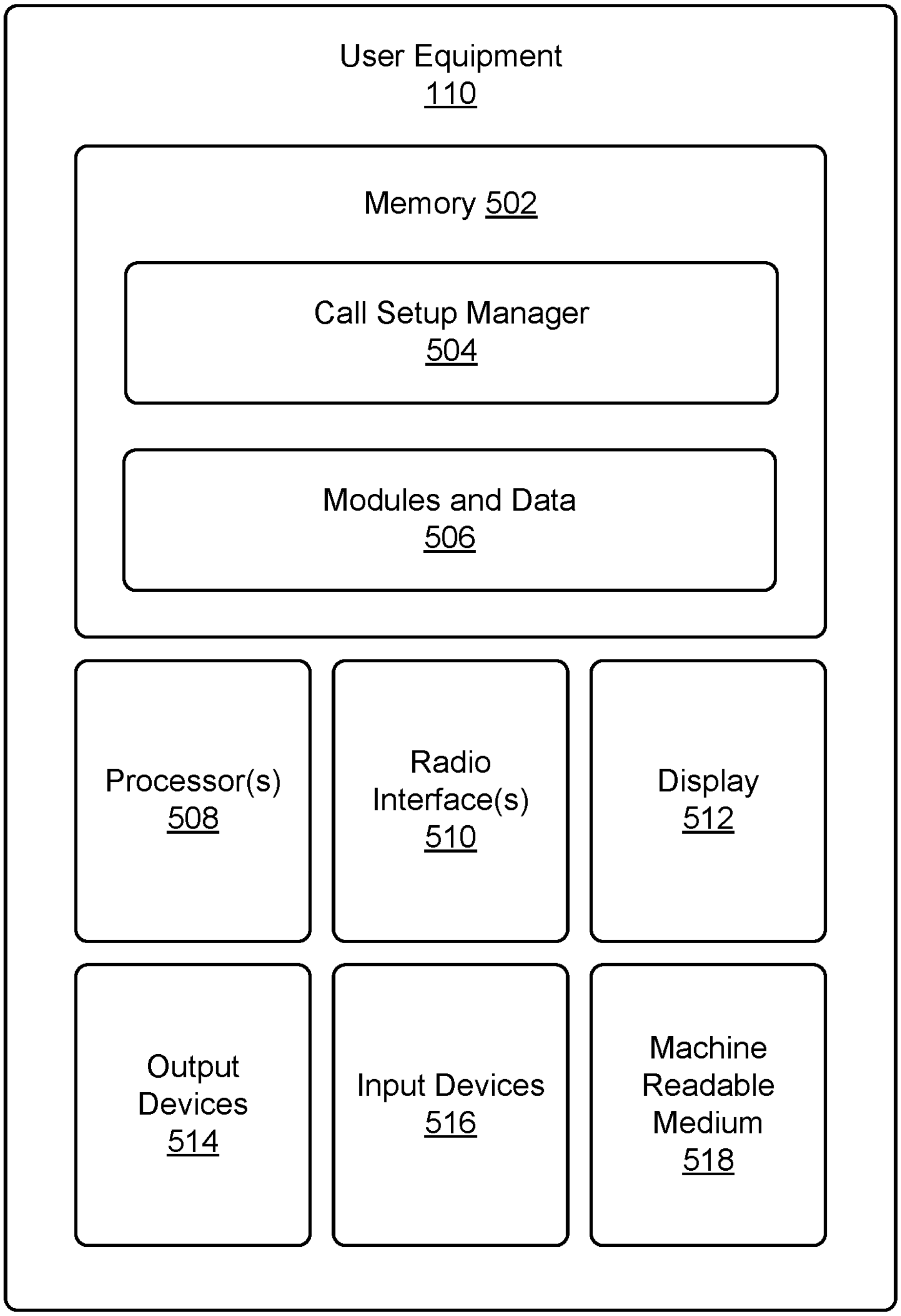
FIG. 5 depicts an example system architecture for a user equipment.

FIG. 5 depicts an example system architecture for a UE 110, in accordance with various examples. As shown, a UE 110 can have memory 502 storing a call setup manager 504, and other modules and data 506. A UE 110 can also comprise processor(s) 508, radio interfaces 510, a display 512, output devices 514, input devices 516, and/or a machine readable medium 518.

In various examples, the memory 502 can include system memory, which may be volatile (such as RAM), non-volatile (such as ROM, flash memory, etc.) or some combination of the two. The memory 502 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the UE 110. Any such non-transitory computer-readable media may be part of the UE 110.

The call setup manager 504 can send and/or receive messages comprising a VoNR service, a ViNR service, and/or an RCS service including SIP messages associated with setup and management of a call session via the IMS. The SIP messages can include an SIP INVITE message and/or other SIP messages. The call setup manager 504 can also or instead send and/or receive messages associated with establishing a control plane and/or a user plane.

The other modules and data 506 can be utilized by the UE 110 to perform or enable performing any action taken by the UE 110. The modules and data 506 can include a UE platform, operating system, and applications, and data utilized by the platform, operating system, and applications.

In various examples, the processor(s) 508 can be a central processing unit (CPU), a graphics processing unit (GPU), or both CPU and GPU, or any other type of processing unit. Each of the one or more processor(s) 508 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 508 may also be responsible for executing all computer applications stored in the memory 502, which can be associated with common types of volatile (RAM) and/or nonvolatile (ROM) memory.

The radio interfaces 510 can include transceivers, modems, interfaces, antennas, and/or other components that perform or assist in exchanging radio frequency (RF) communications with base stations of the telecommunication network, a Wi-Fi access point, and/or otherwise implement connections with one or more networks. For example, the radio interfaces 510 can be compatible with multiple radio access technologies, such as 5G radio access technologies and 4G/LTE radio access technologies. Accordingly, the radio interfaces 510 can allow the UE 110 to connect to the core network(s) 104 as described herein.

The display 512 can be a liquid crystal display or any other type of display commonly used in UEs. For example, display 512 may be a touch-sensitive display screen, and can then also act as an input device or keypad, such as for providing a soft-key keyboard, navigation buttons, or any other type of input. The output devices 514 can include any sort of output devices known in the art, such as the display 512, speakers, a vibrating mechanism, and/or a tactile feedback mechanism. Output devices 514 can also include ports for one or more peripheral devices, such as headphones, peripheral speakers, and/or a peripheral display. The input devices 516 can include any sort of input devices known in the art. For example, input devices 516 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 518 can store one or more sets of instructions, such as software or firmware, that embodies any one or more of the methodologies or functions described herein. The instructions can also reside, completely or at least partially, within the memory 502, processor(s) 508, and/or radio interface(s) 510 during execution thereof by the UE 110. The memory 502 and the processor(s) 508 also can constitute machine readable media 518.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

While one or more examples of the techniques described herein have been described, various alterations, additions, permutations and equivalents thereof are included within the scope of the techniques described herein. For instance, techniques described in FIGS. 5 and 6 can be combined in various ways.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
memory storing computer-executable instructions that, when executed by the one or more processors, cause the system to perform operations comprising:
receiving first sensor data from a first sensor associated with a first location in an environment, the first sensor being associated with a third-party that manages operation of a plurality of sensors in the environment and being unassociated with a user equipment or a vehicle in the environment;
receiving second sensor data from a second sensor associated with the user equipment;
receiving third sensor data from a third sensor associated with the vehicle;
inputting the first sensor data, the second sensor data, and the third sensor data into a model;
receiving, from the model, output data indicating an incident at the first location impacting the user equipment or the vehicle;
determining a distance between the first location and one of: the user equipment or the vehicle;
generating, based at least in part on the distance, a first notification for sending to the user equipment and a second notification for sending to the vehicle, the first notification including a first suggested action for the user equipment based at least in part on a first device type of the user equipment and the second notification including a second suggested action, different than the first suggested action, based at least in part on a second device type, different than the first device type, of the vehicle; and
transmitting the first notification and the second notification over a telecommunications network.

2. The system of claim 1, the operations further comprising:
determining an incident type for the incident based at least in part on the first sensor data or the second sensor data; and
inputting historical data associated with one or more previous incidents of the incident type into the model,
wherein the output data from the model is further based at least in part on the historical data.

3. The system of claim 1, the operations further comprising:
generating a third notification for sending to a device or a fourth sensor associated with the third-party, the third notification including a third suggested action for the device or the fourth sensor relative to the incident; and
transmitting the third notification over the telecommunications network.

4. The system of claim 1, the operations further comprising:

determining supplemental data describing a characteristic of the incident or at least one of the first suggested action or the second suggested action to mitigate an impact of the incident on the user equipment or the vehicle; and including the supplemental data in the first notification for use by the user equipment or the second notification for use by the vehicle.

5. The system of claim 1, the operations further comprising:

generating a third notification for sending to a device associated with the third-party.

6. The system of claim 1, the operations further comprising:

detecting an additional incident during an occurrence of the incident;

generating one or more additional notifications that include one or more additional suggested actions that are to mitigate both the incident and the additional incident; and transmitting the one or more additional notifications over the telecommunications network.

7. The system of claim 1, the operations further comprising:

generating a third notification to be sent to a third-party device that is associated with the first sensor and the third-party, the third notification to cause the third-party device to perform one or more operations associated with the incident; and transmitting, to the third-party device, the third notification over the telecommunications network.

8. The system of claim 1, the operations comprising generating the first notification and the second notification based at least in part an incident type of the incident.

9. One or more non transitory computer readable media storing instructions executable by one or more processors, wherein the instructions, when executed, cause the one or more processors to perform operations comprising:

receiving first sensor data from a first sensor associated with a first location in an environment, the first sensor being associated with a third-party that manages operation of a plurality of sensors in the environment and being unassociated with a user equipment or a vehicle in the environment;

receiving second sensor data from a second sensor associated with the user equipment;

receiving third sensor data from a third sensor associated with the vehicle;

inputting the first sensor data, the second sensor data, and the third sensor data into a model;

receiving, from the model, output data indicating an incident at the first location impacting the user equipment or the vehicle;

determining a distance between the first location and one of: the user equipment or the vehicle;

generating, based at least in part on the distance, a first notification for sending to the user equipment and a second notification for sending to the vehicle, the first notification including a first suggested action for the user equipment based at least in part on a first device type of the user equipment and the second notification including a second suggested action, different than the first suggested action, based at least in part on a second device type, different than the first device type, of the vehicle; and transmitting the first notification and the second notification over a telecommunications network.

10. The one or more non transitory computer readable media of claim 9, the operations further comprising:

determining an incident type for the incident based at least in part on the first sensor data or the second sensor data; and inputting historical data associated with one or more previous incidents of the incident type into the model, wherein the output data from the model is further based at least in part on the historical data.

11. The one or more non transitory computer readable media of claim 9, the operations further comprising:

generating a third notification for sending to a device or a fourth sensor associated with the third-party, the third notification including a third suggested action for the device or the fourth sensor relative to the incident; and transmitting the third notification over the telecommunications network.

12. The one or more non transitory computer readable media of claim 9, the operations further comprising:

determining supplemental data describing a characteristic of the incident or at least one of the first suggested action or the second suggested action to mitigate an impact of the incident on the user equipment or the vehicle; and including the supplemental data in the first notification for use by the user equipment or the second notification for use by the vehicle.

13. A method comprising:

receiving first sensor data from a first sensor associated with a first location in an environment, the first sensor being associated with a third-party that manages operation of a plurality of sensors in the environment and being unassociated with a user equipment or a vehicle in the environment;

receiving second sensor data from a second sensor associated with the user equipment;

receiving third sensor data from a third sensor associated with the vehicle;

inputting the first sensor data, the second sensor data, and the third sensor data into a model;

receiving, from the model, output data indicating an incident at the first location impacting the user equipment or the vehicle;

determining a distance between the first location and one of: the user equipment or the vehicle;

generating, based at least in part on the distance, a first notification for sending to the user equipment and a second notification for sending to the vehicle, the first notification including a first suggested action for the user equipment based at least in part on a first device type of the user equipment and the second notification including a second suggested action, different than the first suggested action, based at least in part on a second device type, different than the first device type, of the vehicle; and transmitting the first notification and the second notification over a telecommunications network.

14. The method of claim 13, further comprising:

determining an incident type for the incident based at least in part on the first sensor data, the second sensor data, or the third sensor data; and inputting historical data associated with one or more previous incidents of the incident type into the model, wherein the output data from the model is further based at least in part on the historical data.

15. The method of claim 13, further comprising:

generating a third notification for sending to a device or a fourth sensor associated with the third-party, the third notification including a third suggested action for the device or the fourth sensor relative to the incident; and transmitting the third notification over the telecommunications network.

16. The method of claim 13, further comprising:

determining supplemental data describing a characteristic of the incident or at least one of the first suggested action or the second suggested action to mitigate an impact of the incident on the user equipment or the vehicle; and including the supplemental data in the first notification for use by the user equipment or the second notification for use by the vehicle.

17. The method of claim 13, further comprising:

generating a third notification for sending to a device associated with the third-party.

18. The method of claim 13, further comprising:

generating a third notification for sending to a Public Service Answering Point (PSAP), the third notification including supplemental information about the incident; and transmitting the third notification over the telecommunications network to the PSAP.

19. The method of claim 13, wherein the first sensor is associated with a fixed structure that is controlled by the third-party and the user equipment is an unmanned aerial vehicle.

20. The method of claim 13, wherein the first sensor is a moveable sensor that is configured to be detachably attached to multiple different structures that are controlled by the third-party.

* * * * *